Dec. 29, 1970    J. J. BUNDSCHUH ET AL    3,551,038
SINGLE-POINT LATCH AND INTERLOCK FOR A CARTRIDGE-LOADED
MOTION PICTURE PROJECTOR
Filed May 23, 1968    2 Sheets-Sheet 1
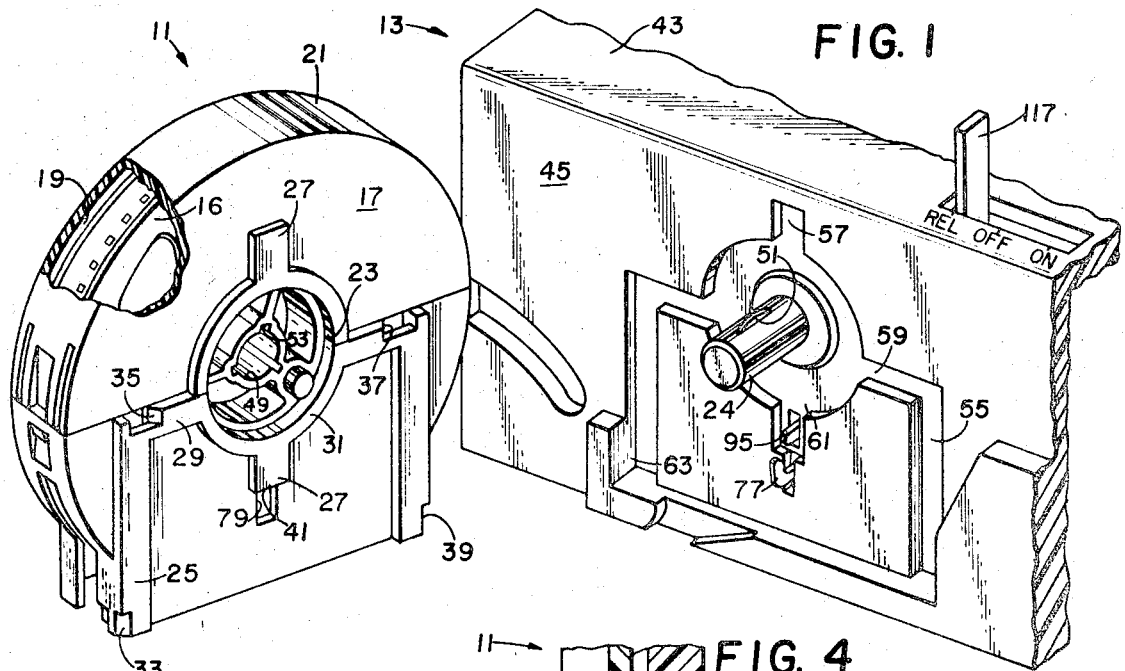
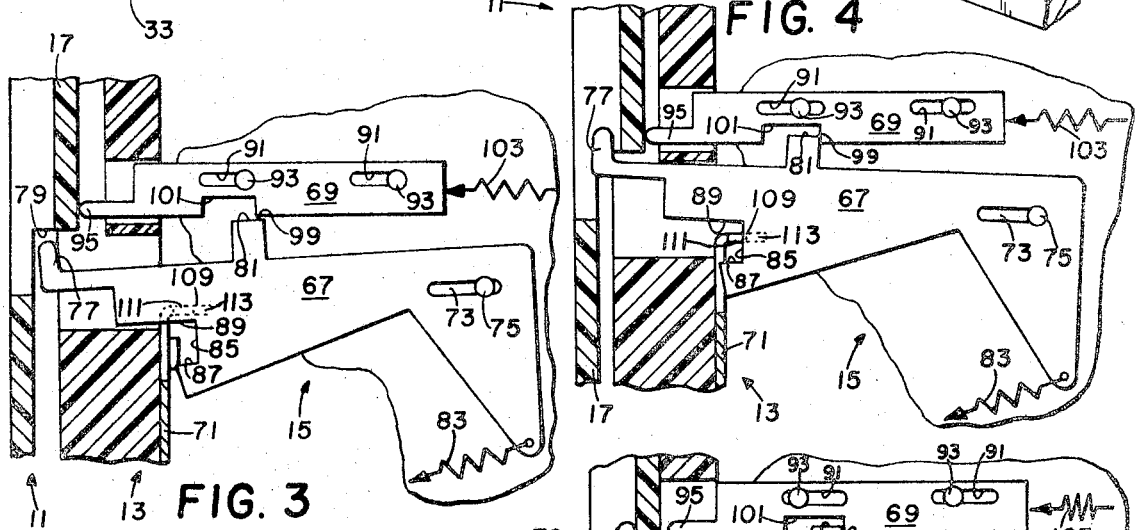
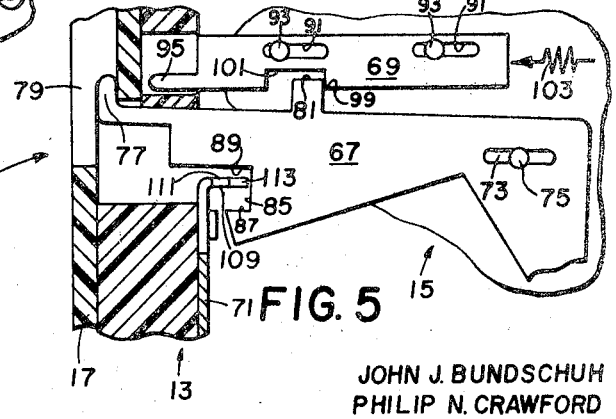
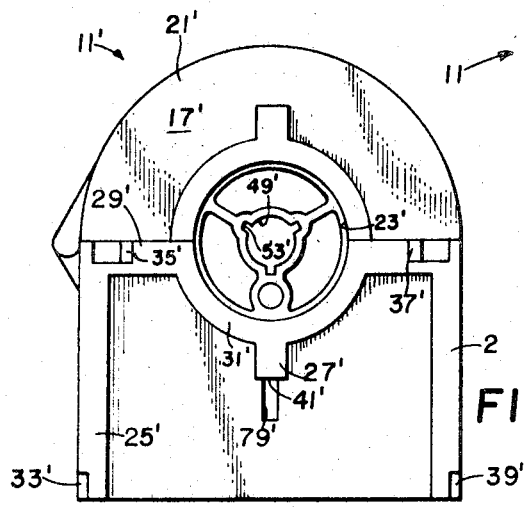
JOHN J. BUNDSCHUH
PHILIP N. CRAWFORD
INVENTORS
BY
ATTORNEYS

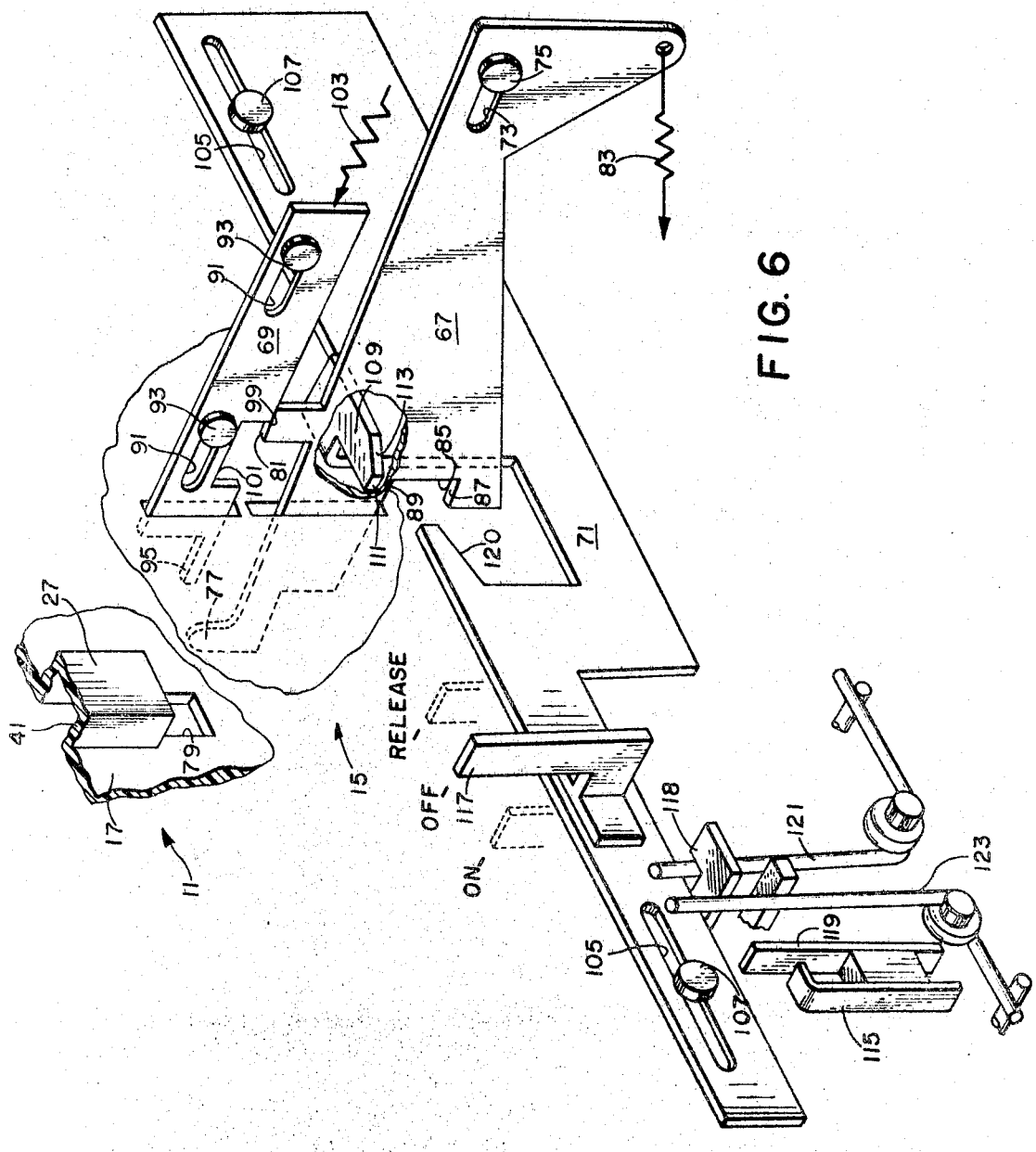

United States Patent Office 3,551,038
Patented Dec. 29, 1970

3,551,038
SINGLE-POINT LATCH AND INTERLOCK FOR A CARTRIDGE-LOADED MOTION PICTURE PROJECTOR
John J. Bundschuh, Penfield, and Philip N. Crawford, Rochester, N.Y., assignors to Eastman Kodak Company, Rochester, N.Y., a corporation of New Jersey
Filed May 23, 1968, Ser. No. 731,464
Int. Cl. G03b 23/02
U.S. Cl. 352—72                                        6 Claims

ABSTRACT OF THE DISCLOSURE

A latching mechanism for engaging and retaining a cartridge on a motion picture projector or the like, having a latching member which engages the cartridge at a single latching area to securely latch the cartridge to the projector. The latching mechism may also be provided with a mechanical interlock to disable the projector except when a cartridge is properly positioned thereon. Further, the latching mechanism may be tied-in with a projector projector "on-off-release" switch to automaticaally release the cartridge from the projector when the switch is moved to the release position.

Reference is made to commonly assigned copending U.S. application Ser. No. 685,616, entitled Cinematographic Projectors or the Like and Cartridges for Use therewith, filed in the name of John J. Bundschuh et al. on Nov. 24, 1967; commonly assigned copending U.S. application Ser. No. 685,588, entitled Cartridge, filed in the name of John J. Bundschuh et al. on Nov. 24, 1967; and commonly assigned copending U.S. application Serial 681,295, entitled Automatic Latching Mechanism and Film Guide Arm for a Cartrige-Loaded Motion Picture Projector, filed in the name of Leslie J. Bunting on Nov. 7, 1967, now U.S. Pat. 3,394,901, issued on July 30, 1968.

BACKGROUND OF THE INVENTION

This invention relates to cartridges adapted to receive rolls of strip material and to mechanisms for retaining cartridges containing strip material to devices for handling such material. More particularly, the invention relates to a retaining mechanism for engaging a cartridge at a single point or area to releasably latch the cartridge to a motion picture projector or the like.

In order to simplify the use of motion picture projectors, and the handling of processed motion picure film to be used therewith, it is known to place the film in cartridges capable of being latched to the projector. Such a cartridge, and a projector capable of holding the cartridge and automatically engaging and removing the film from the cartridge, are disclosed in commonly assigned U.S. application Ser. No. 685,616, entitled Cinematographic Projectors or the Like and Cartridges for Use Therewith, filed in the name of John J. Bundschuh et al, on Nov. 24, 1967.

Cartridges of the type disclosed in the above application are adapted to contain a standard supply reel, and have side-walls with openings therein through which the projector supply spindle can extend to rotatably support the reel in the cartridge. In order to operate satisfactorily, it is important that the cartridge be properly oriented and aligned when it is positioned on or in a projector to assure that the cartridge openings, the reel hub, and the projector spindle are oriented coaxially. Further, the spindle should support the reel near the center of the cartridge where friction between the reel and the cartridge will be minimum to assure free rotation of the reel in the cartridge.

Due to the precise requirements for the cartridge location, and the necessity of a simple yet fool-proof means for retaining the cartridge on the projector in an orientated position, considerable attention has been directed to latching mechanisms for engaging and retaining a cartridge on a projector. For example, commonly assigned U.S. application Ser. No. 681,295, entitled Automatic Latching Mechanism and Film Guide Arm for a Cartridge Loaded Motion Pitcure Projector, filed in the name of Leslie J. Bunting on Nov. 7, 1967, discloses one such mechanism which utilizes two levers adapted to engage opposite sides of a cartridge to hold the cartridge on the projector. As the cartridge is positioned on the projector, beveled surfaces on the cartridge engage similar surfaces on the levers to cam the levers outwardly. When the cartridge is in position, the levers move back to their original position about the cartridge surfaces to hold the cartridge to the projector.

Another such latching mechanism is disclosed in Camras U.S. Pat. No. 2,572,596, issued on Oct. 23, 1951. This patent discloses an over-center linkage having a latch position and a release position. As the linkage is moved to the latch position, bent fingers enter slots in opposite sides of the cartridge to securely hold the cartridge on a tape recorder. The linkage also is operably connected to an on-off switch which enegizes or de-energizes the recorder as the linkage moves between its latch and release positions.

While such prior latching mechanisms appear to be satisfactory for their intended purpose, a more universal or versatile mechanism is needed which is capable of operating rapidly, easily and with precision, regardless of the size or shape of the cartridge to which it is applied.

SUMMARY OF THE INVENTION

In accordance with the present invention a cartridge retaining means is effective to engage a cartridge at a single area to retain the cartridge on a motion picture projector or the like. The basic simplicity of such a retaining means renders it suitable for use with different size cartridges, having appropriate orienting surfaces, without modification. Optionally, means can be provided to cooperate with the retaining means to pevent operation of the projector except when the cartridge is properly positioned to be engaged by the retaining means.

In the described embodiment of the invention, the retaining means take the form of a single-point or single-area latching means having a latching arm movable between a "release" position, a "holding" position and a "latching" position. As a cartridge is situated on the projector, a sensing finger of the latching means is engaged by a surface of the cartridge and causes the latching arm to shift from the release position to the holding position wherein a single latching finger on the arm loosely holds the cartridge to the projector. If the cartridge is properly positioned on the projector, the mechanism can be shifted from the holding position to the latching position wherein a cam means urges the latching finger against a latching surface on the cartridge to securely latch the cartridge to the projector. To remove the cartridge from the projector, the arm is returned to the release position by another cam means which shifts the latching arm back to the release position. In one embodiment of the invention, the latching mechanism can be arranged to cooperate with a projector "on-off-release" switch such that movement of the switch to the "on" position shifts the latching arm to the latching position, while movement of the switch to the "release" position releases the cartridge and resets the arm to the released position. In this embodiment the projector is disabled and cannot be energized, except when a cartridge is properly positioned on the projector.

Other features and advantages will become apparent from the following description of an illustrative preferred embodiment of the invention.

BRIEF DESCRIPTION OF THE DRAWINGS

In the drawings:

FIG. 1 is a perspective view of a cartridge and a portion of a projector, with the cartridge turned relative to the projector to show the surface formations on the cartridge and the projector which serve to align the cartridge on the projector, and to show a portion of a cartridge latching finger and a cartridge latching surface in accordance with a preferred embodiment of the present invention.

FIG. 2 is a rear elevational view, showing a cartridge which differs in size and shape from that of FIG. 1, but which has a similar latching surface and similar aligning formations.

FIG. 3 is a schematic view of the latching mechanism in accordance with one embodiment of the present invention, showing the mechanism in a release position.

FIG. 4 is a schematic view of the latching mechanism depicted in FIG. 3, showing the mechanism in a hold position.

FIG. 5 is a schematic view of the latching mechanism depicted in FIG. 3, showing the mechanism in a latching position.

FIG. 6 is a schematic view of the latching mechanism in the release position, showing details of the mechanism and the manner in which the mechanism can be tied-in with the projector on-off-release switch.

DESCRIPTION OF THE PREFERRED EMBODIMENT

Referring now to the drawings, a preferred embodiment of the present invention is disclosed comprising a cartridge 11, a structure 13 representing a portion of the motion picture projector, and a latching means 15 for latching the cartridge 11 to the projector.

Cartridge 11, described in more detail in copending application Ser. No. 685,588, entitled Cartridge, and filed in the name of John J. Bundschuh on Nov. 24, 1967, is adapted to contain a standard reel 16 of processed motion picture film. As shown in FIG. 1, the cartridge comprises two side-walls 17 and 19 and an edge-wall 21. Side-walls 17 and 19 are separated in spaced parallel relation by edge-wall 21, which joins the side-walls along the peripheries thereof to define a chamber for receiving the film reel 16. One or both side-walls 17 and 19 have openings 23 therethrough adapted to receive a rotatable drive member or spindle 24 of a motion picture projector. When the cartridge is in operative position on the projector, spindle 24 will extend into or through the cartridge openings 23 to engage and support the reel 16 for rotation within the cartridge 11.

To orient and align the cartridge on the projector, one side-wall 17 of the cartridge is provided with orientation means comprising a pattern of surface formations or irregularities thereon, preferably in the form of raised ribs or protrusions 25, 27, 29 and 31, which correspond to and are adapted to mate with complemental recesses on the projector structure 13. Ribs 25, 27, 29 and 31 also serve to strengthen the cartridge and give it rigidity, particularly adjacent latching surfaces or apertures 33, 35, 37, 39 and 41 thereon. Latching surfaces 33, 35, 37 and 39 are adapted to receive latching levers of the type disclosed in the above-mentioned copending application Ser. No. 681,295. Latching surface 41, on the other hand, is adapted to receive a single latching arm or finger in accordance with the present invention. Surface 41 and other features of the cartridge particularly pertinent to the present invention will be described more fully hereinafter in connection with structure 13 and latching means 15.

Referring now to structure 13 which represents a motion picture projector (such as the projector disclosed in copending application Ser. No. 685,616), a projector casing or housing 43 supports a vertical mounting structure such as wall or mechanism plate 45. The spindle 24 extends through mechanism plate 45 and, as previously mentioned, fits loosely through opening 23 of the cartridge 11 and snugly into hub 49 of the reel 16, to thereby support the reel for rotation in the cartridge 11. Hub 49 is free to slide axially on spindle 24 to assume the position within the center of the cartridge of least frictional resistance to rotation. Rotational movement of the hub with respect to the spindle is prevented by a detent 51 which is received by recess 53 of hub 49.

A pattern of surface formations on mechanism plate 45, preferably taking the form of recesses 55, 57, 59 and 61, correspond to the pattern of formations 25, 27, 29 and 31 respectively on cartridge 11 to receive the latter when the cartridge is inserted on the projector to thereby properly align the cartridge on the projector and prevent movement therebetween. Preferably, the pattern of formations on the cartridge and projector define a projector-cartridge interface which includes horizontally and vertically oriented ribs and recesses which will align and prevent movement of the cartridge with respect to the projector in all directions parallel to the plane of the interface. Thus, a retaining means for holding the cartridge to the projector need only prevent movement of the cartridge in a direction perpendicular to the interface. Further surface configurations 63 on mechanism plate 45 serve to aid in generally locating the cartridge as it is being positioned on the projector. However, the mating ribs and recesses previously described provide the primary aligning function once the cartridge is in position.

Referring now to FIGS. 3–6 and in more detail to features of an embodiment of the present invention, the cartridge retaining means comprises a latching arm 67, a sensing member 69 and a camming or interlock plate 71, all of which may be operably mounted, for example, on the projector housing 43 or on the back of mechanism plate 45.

Latching arm 67 is movably mounted on the projector by means of a slot 73 in the arm 67 and pin 75 fixedly supported on the projector whereby the arm can be pivoted about the pin 75 and/or moved rectilinearly in a direction perpendicular to the projector-cartridge interface. By such pivoting and/or rectilinear movement, arm 67 can assume a forward and lowered position, as shown in FIGS. 3 and 6, a forward and raised position, as shown in FIG. 4, or a retracted position, as shown in FIG. 5. As will be described more fully hereinafter, the forward and lowered position (FIGS. 3 and 6) of arm 67 corresponds to the released position of the retaining means, the forward and raised position (FIG. 4) of arm 67 corresponds to the hold position of the retaining means, and the retracted position (FIG. 5) of arm 67 corresponds to the latching position of the retaining means.

A clamping portion of the latching arm 67, taking the form of a catch or bent finger 77, extends through mechanism plate 45 and sufficiently therebeyond to permit the finger to enter latching slot 79 in the cartridge side-wall 17 below latching surface 41 of the cartridge. Moreover, finger 77 is arranged so that when it is in the forward and lowered position shown on FIGS. 3 and 6, it is loosely received by the slot 79 when the cartridge is properly oriented and placed on the projector.

An abutment or stop 81 on latching arm 67 interferes with movement of the arm from its release position (FIGS. 3 and 6) to its holding position (FIG. 4). As will be described more fully hereinafter in connection with sensing member 69, spring 83 urges arm 67 in a clockwise direction about pin 75 (as viewed in FIG. 3), but stop 81 engages sensing arm 69 to prevent such clockwise rotation unless a cartridge is properly positioned on the projector.

Another portion of the arm 67 defines first and second cam surfaces 85 and 87, respectively, and a blocking surface 89, which cooperates with movable camming or interlock plate 71 in a manner to be described more fully hereinafter. Briefly, however, surface 85 cooperates with plate 71 to cam the latching arm 67 to a latching position (FIG. 5) wherein the cartridge will be securely held to the projector by finger 77. Blocking surface 89, on the other hand, prevents such movement of plate 71 except when the cartridge is in the proper position to be latched to the projector. Second surface 87 serves to recock the latching arm 67 into a release position (FIGS. 3 and 6) when the cartridge is removed from the projector.

Sensing member 69 is mounted on the projector in a manner similar to arm 67 by means of two slots 91 in member 69 and two pins 93 fixed to the projector for rectilinear movement perpendicular to the projector-cartridge interface. A feeler portion of the sensing arm, in the form of a tongue 95, extends through mechanism plate 45 and sufficiently therebeyond when in the forward position shown in FIGS. 3 and 6 to interfere slightly with the positioning of the cartridge on the projector for a purpose to be explained hereinafter.

Sensing arm 69 also defines an interference surface 99 and a notch or recess 101. When sensing arm 69 is in its forward position (FIGS. 3 and 6), intereference surface 99 is engaged by stop 81 of latching arm 67 and prevents clockwise rotation of the latching arm. Notch 101, however, when located over stop 81, will accommodate the stop and thus permit clockwise rotation of the latching arm to a raised position as shown on FIG. 4. In this forward but raised position of the latching arm, the finger 77 will hold a cartridge on the projector and maintain the cartridge against wall 45 as shown in FIG. 5.

Spring 103 normally urges sensing arm 69 to its forward position (FIGS. 3 and 6) wherein interference surface 99 holds latching arm 67 in its lowered position so that the cartridge can easily be positioned over finger 77. However, when the cartridge is positioned on the projector, the resulting engagement of cartridge surface 27 with feeler 95 forces the sensing arm 69 against the bias of spring 103 to a retracted position. In this retracted position of sensing arm 69, notch 101 is located over stop 81 and permits rotation of latching arm 67 to the raised or holding position shown in FIG. 4 wherein it loosely holds the cartridge on the projector.

As shown in FIG. 6, camming or interlock plate 71 is mounted on the projector by two slots 105 in the plate 71 which receive two pins 107 fixed to the projector wall for rectilinear movement in a plane parallel to the projector-cartridge interface. A bent portion of the plate 71 defines a cam or pusher 109, the forward portion 111 of which will engage blocking surface 89 to prevent movement of arm 71 when the latching arm 67 is in the release or forward and lowered position (FIGS. 3 and 6). On the other hand, when latching arm 67 is in the raised position (FIGS. 4 and 5), as when a cartridge is properly positioned on the projector, a camming portion 113 of the pusher 109 will engage surface 85 in response to movement of plate 71 to cam latching arm 67 from the hold or forward and raised position to a latching or retracted position as shown in FIG. 5.

If desired, camming or interlock plate 71 can be arranged to cooperate with means operable to energize the projector, such as a projector "on-off" switch 115, by operatively connecting an "on-off-release" operating knob 117 to the plate 71, and by constructing plate 71 so it will engage the projector "on-off" switch to turn the projector on when the arm 67 is in the cartridge retaining position. In the embodiment shown, protrusion 118 on plate 71 will engage movable contact arm 119 of switch 115 to energize the projector when plate 71 is moved by knob 117 to the left as viewed in FIG. 6. In this manner, an interlock can be provided which will disable or prevent operation of the projector except when a cartridge is properly positioned thereon. When no cartridge is on the projector, latching arm 67 will be held in the lowered position by sensing arm 69 and blocking surface 89 will prevent movement of camming or interlock plate 71 in the direction to engage the projector energizing switch 115 (to the left in FIG. 6). On the other hand, when a cartridge is properly positioned on the projector, sensing arm 69 will be retracted and latching arm 67 will be in the raised position and will permit movement of plate 71 in the direction to engage switch 115 and energize the projector.

Camming or interlock plate 71 also defines a second camming surface 120 which engages surface 87 of latching arm 67 upon movement of camming or interlock plate 71 to the right as viewed in FIG. 6 to recock latching arm 67 and release the cartridge from the projector. In a manner similar to that described above, the plate 71 can be tied-in with the on-off-release knob 117 to release the cartridge upon movement of the knob, to the release position.

Referring now to FIGS. 3–6, for an overall description of the operation of the cartridge retaining means, the latching mechanism disclosed has three operative positions or conditions. In one position, disclosed in FIGS. 3 and 6, the arm 67 is in a release position wherein a cartridge can easily be positioned on or removed from the latching finger 77. Thus, while spring 83 urges arm 67 and finger 77 to a raised position, the arm 67 is held in the lowered position by sensing arm 69. The mechanism cam or interlock plate 71 is maintained in a neutral position, by hairpin springs 121 and 123 (FIG. 6), which neutral position corresponds to the "off" position of the projector "on-off-release" knob 117. Movement of interlock arm 71 in a direction to latch the cartridge to the projector or to energize the projector is prevented by blocking surface 89.

When a cartridge is positioned on finger 77 and is pushed inwardly toward mechanism plate 45, surface 97 of the cartridge will engage feeler 95 and force sensing arm 69, against the bias of spring 103, to a retracted position. When in the retracted position, notch 101 of sensing arm 69 will be in alignment with stop 81 of the latching arm to permit the arm to be moved to a holding or raised position by the action of spring 83. In this holding position of the latching and sensing arms (FIG. 4), finger 77 will loosely hold the cartridge to the projector. Moreover, blocking surface 89 is now in a raised position which will permit movement of camming or interlock plate 71 and therefore also "on-off-release" knob 117 to latch a cartridge to the projector and to energize the projector.

Camming or interlock plate 71 can now be moved to the left, as shown in FIG. 6, corresponding to the "on" position of knob 117 such that the camming portion 113 of pusher 109 will engage camming surface 85 of latching arm 67. Further movement of plate 71 will move the latching arm 67 to a latching or retracted position (FIG. 5) and will also energize the projector. In this latching position, the latching arm firmly and positively attaches the cartridge to the projector.

When it is desired to release the cartridge from the projector, camming or interlock plate 71 is moved by means of knob 117 such that camming portion 113 releases the latching arm and permits the arm to be returned to the forward or holding position by spring 83. Upon further movement of camming or latching plate 71, second camming surface 120 thereof engages surface 87 of the latching arm to recock the arm to the release or forward and lowered position.

Referring now to FIG. 2, a different cartridge is shown wherein features corresponding to the features previously described in connection with the cartridge of FIG. 1 are identified by "primed" numerals similar to those of FIG. 1. From a comparison of FIGS. 1 and 2, it should be apparent that the cartridge retaining means disclosed is not effected by the particular size and shape of the cartridge, since the latch is adapted to engage the cartridge, at only a single location which can be commonly located on all sizes of cartridges. While the cartridge of FIG. 2 has been shown as smaller than the cartridge of FIG. 1, the same latching mechanism can be used on a universal projector adapted to accept 400-foot or even larger cartridges.

The invention has been described in detail with particular reference to preferred embodiments thereof, but it will be understood that variations and modifications can be effected within the spirit and scope of the invention as described hereinabove and as defined in the appended claims.

We claim:

1. In a motion picture projector for projecting film contained within a cartridge adapted to be positioned on the projector, the cartridge having a wall with a latch receiving opening therein, the improvement comprising:
   means on the projector for locating the cartridge on the projector,
   latch means on the projector for latching the cartridge to the projector, said latch means comprising a latching arm having a finger thereon defining a cartridge clamping portion, said arm being mounted on the projector for movement between (1) a cartridge releasing position wherein the finger is positioned with respect to said cartridge locating means so that the finger can enter the latch receiving opening in a cartridge as the cartridge is being located on the projector by the use of said locating means and (2) a cartridge latching position wherein the finger is positioned for clamping the cartridge onto the projector.
   means operatively coupled to said arm for moving said arm between its cartridge releasing position and its cartridge latching position;
   means on the projector adjustable with respect to said arm between (1) a first position wherein it is effective to prevent movement of said arm from the releasing position to the latching position and (2) a second position wherein it allows movement of said arm from the cartridge releasing position to the cartridge latching position, said adjustable means having a portion positioned with respect to said locating means so that the adjustable means is engageable by a cartridge as the cartridge is being mounted onto the projector for effecting movement of said adjustable means from its first position to its second position, thereby to allow movement of said arm from its releasing position to its latching position.

2. In a motion picture projector as set forth in claim 1 further comprising mounting means mounting said arm onto the projector for both pivotal and sliding movement of the arm, and said means for moving said arm comprises (1) a spring coupled to said arm for biasing said arm in a pivotal direction and (2) cam means on the projector engageable with the arm for effecting sliding movement of the arm.

3. In a motion picture projector as set forth in claim 2 wherein said means for moving said arm further comprises a second cam movable into engagement with said arm for effecting movement of said arm from its cartridge latching position to its cartridge releasing position.

4. In a motion picture projector as set forth in claim 1 wherein said means for moving said arm comprises a cam engageable with said arm for moving the arm from its cartridge releasing position to its cartridge latching position, and the projector further comprising projector control means including normally open switch means, and means coupled to said switch means and to said cam for closing said switch means in response to movement of said cam for moving said arm to the cartridge latching position.

5. A latching mechanism for latching a cartridge to a machine, comprising: a latching arm mounted on the machine for movement between a latching position wherein the arm engages and latches the cartridge to the machine and a release position wherein the arm is ineffective to latch the cartridge to the machine; means for moving said latching arm from the release position to the latching position; a member mounted on the machine for movement between a first position and a second position, said member being configured to obstruct movement of said latching arm from the release position to the latching position when said member is in the first position and to allow movement of the latching arm from the release position to the latching position when said member is in the second position; and a detecting means operably connected to said member and responsive to the positioning of the cartridge onto the machine to move said member from the first position to the second position, whereby the latching arm can be moved from the release position, to the latching position by said means to thereby latch the cartridge to the machine.

6. In a motion picture projector, a latching mechanism for latching a cartridge to the projector, comprising:
   first means having a bent latching finger adapted to engage and retain the cartridge on the projector, said first means being mounted on the projector to move between a release position, a holding position and a latching position;
   second means urging said first means toward the holding position;
   third means having a first position which prevents movement of said first means to the holding position and a second position which permits movement of said first means to the holding position, said third means including a feeling means for engaging the cartridge and moving the third means from the first position to the second position when a cartridge is positioned on the projector to permit said arm to move from the releasing position to the holding position;
   cam means engageable with said first means for moving said first means from the holding position to the latching position to latch a cartridge to the projector and from the holding position to the release position to release a cartridge from the projector.

References Cited

UNITED STATES PATENTS

| | | | |
|---|---|---|---|
| 3,362,774 | 1/1968 | Easterly | 352—72 |
| 3,025,750 | 3/1962 | Polan et al. | 352—10 |
| 2,912,899 | 11/1959 | Wangerin et al. | 352—72 |
| 3,454,333 | 7/1969 | Wells | 352—72 |

JOHN M. HORAN, Primary Examiner

M. HARRIS, Assistant Examiner

U.S. Cl. X.R.

242—71.1, 99; 352—74